(12) United States Patent
Mizutani et al.

(10) Patent No.: US 10,950,064 B2
(45) Date of Patent: *Mar. 16, 2021

(54) SERVER AND INFORMATION SYSTEM MATCHING A POWER-SUPPLYING VEHICLE AND A POWER-RECEIVING VEHICLE

(71) Applicant: TOYOTA JIDOSHA KABUSHIKI KAISHA, Toyota (JP)

(72) Inventors: Atsushi Mizutani, Toyota (JP); Daiki Kaneichi, Nisshin (JP); Hirotaka Karube, Toyota (JP); Jun Kondo, Nisshin (JP); Kenichi Komuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,684

(22) Filed: Oct. 30, 2018

(65) Prior Publication Data

US 2019/0130661 A1 May 2, 2019

(30) Foreign Application Priority Data

Nov. 1, 2017 (JP) .............................. JP2017-212086

(51) Int. Cl.
*G07C 5/00* (2006.01)
*H04W 4/44* (2018.01)
*B60L 53/60* (2019.01)

(52) U.S. Cl.
CPC .............. *G07C 5/008* (2013.01); *B60L 53/60* (2019.02); *H04W 4/44* (2018.02)

(58) Field of Classification Search
CPC ........... G07C 5/008; H04W 4/44; B60L 53/60
(Continued)

(56) References Cited

U.S. PATENT DOCUMENTS 8,720,968 B2 5/2014 Zalan et al.
8,845,001 B2 9/2014 Kotama et al.
(Continued)

FOREIGN PATENT DOCUMENTS

JP 2012128587 A 7/2012
JP 2013115873 A 6/2013
(Continued)

OTHER PUBLICATIONS

United States Patent and Trademark Office, Non-Final Office Action issued to U.S. Appl. No. 16/174,580 dated Feb. 19, 2020, 26 pages.
(Continued)

*Primary Examiner* — David P Zarka
(74) *Attorney, Agent, or Firm* — Hunton Andrews Kurth LLP (57) ABSTRACT

An information providing system includes: a plurality of vehicles; and a server configured to communicate with the plurality of vehicles. Each of the plurality of vehicles is configured to supply power to and receive power from another vehicle. The server performs a matching process for setting a power-supplying vehicle and a power-receiving vehicle from the plurality of vehicles and for matching the power-supplying vehicle and the power-receiving vehicle. The server prohibits setting, as the power-supplying vehicle in the matching process, a vehicle included in the plurality of vehicles and having a history that power has been received from another vehicle.

2 Claims, 6 Drawing Sheets

(58) Field of Classification Search
USPC .......................................................... 709/217
See application file for complete search history.

(56) References Cited

U.S. PATENT DOCUMENTS

| | | | | |
|---|---|---|---|---|
| 9,407,105 | B2* | 8/2016 | Hyde ..................... | H02J 7/0054 |
| 10,011,181 | B2* | 7/2018 | Dudar ..................... | H01F 38/14 |
| 10,333,338 | B2* | 6/2019 | Zenner ..................... | B60L 7/18 |
| 2002/0065703 | A1* | 5/2002 | Garg ................... | G06Q 10/0631 |
| | | | | 705/7.12 |
| 2009/0313033 | A1* | 12/2009 | Hafner ................... | B60L 8/003 |
| | | | | 705/1.1 |
| 2011/0202418 | A1 | 8/2011 | Kempton et al. | |
| 2011/0224900 | A1* | 9/2011 | Hiruta ................ | G01C 21/3469 |
| | | | | 701/533 |
| 2011/0238519 | A1* | 9/2011 | Basak ................... | G06Q 30/08 |
| | | | | 705/26.3 |
| 2012/0146582 | A1* | 6/2012 | Lei ......................... | B60L 53/60 |
| | | | | 320/109 |
| 2012/0303259 | A1* | 11/2012 | Prosser ................... | B60L 53/57 |
| | | | | 701/400 |
| 2014/0089064 | A1* | 3/2014 | Hyde ................. | G06Q 30/0611 |
| | | | | 705/14.4 |
| 2014/0188318 | A1 | 7/2014 | Langgood et al. | |
| 2014/0324248 | A1* | 10/2014 | Huntzicker .............. | B60D 1/24 |
| | | | | 701/2 |
| 2014/0375272 | A1* | 12/2014 | Johnsen .................. | B60L 53/14 |
| | | | | 320/136 |
| 2015/0123607 | A1 | 5/2015 | Fujita et al. | |
| 2018/0086223 | A1* | 3/2018 | Lindemann ......... | B60L 11/1862 |
| 2018/0260882 | A1 | 9/2018 | Friedman et al. | |
| 2018/0307226 | A1 | 10/2018 | Chase et al. | |
| 2018/0329429 | A1 | 11/2018 | Yamaguchi et al. | |
| 2019/0001833 | A1 | 1/2019 | Coburn et al. | |

FOREIGN PATENT DOCUMENTS

| | | |
|---|---|---|
| JP | 2013-130963 A | 7/2013 |
| JP | 2014204494 A | 10/2014 |
| WO | 2014010295 A1 | 1/2014 |

OTHER PUBLICATIONS

United States Patent and Trademark Office, Notice of Allowance issued to U.S. Appl. No. 16/174,580 dated Jun. 1, 2020, 16 pages.
Kang, J., et al., "Enabling Localized Peer-to-Peer Electricity Trading Among Plug-in Hybrid Electric Vehicles Using Consortium Blockchains", IEEE Transactions on Industrial Informatics, (Dec. 2017), vol. 13, No. 6, pp. 3154-3164, 11 pages.

* cited by examiner

POWER-RECEIVING VEHICLE

POWER-SUPPLYING VEHICLE

SERVER AND INFORMATION SYSTEM MATCHING A POWER-SUPPLYING VEHICLE AND A POWER-RECEIVING VEHICLE

This nonprovisional application is based on Japanese Patent Application No. 2017-212086 filed on Nov. 1, 2017, with the Japan Patent Office, the entire contents of which are hereby incorporated by reference.

BACKGROUND

Field

The present disclosure relates to server and information providing system for providing information to an electrically powered vehicle.

Description of the Background Art

Japanese Patent Laying-Open No. 2013-130963 discloses a charging system that provides a service for aiding to charge an electrically powered vehicle that needs to be charged. This charging system includes a server and a plurality of electrically powered vehicles. The server verifies information of a power-receiving vehicle requesting charging against information of power-supplying permitted vehicles having transmitted indications that they are capable of supplying power to another vehicle, selects a power-supplying vehicle that satisfies a required condition from the power-supplying permitted vehicles, and provides information of the selected power-supplying vehicle to the power-receiving vehicle.

SUMMARY

Generally, when supplying power from a power-supplying vehicle to a power-receiving vehicle, power conversion (conversion between DC and AC or conversion of DC voltage) is performed in at least one of the power-supplying vehicle and the power-receiving vehicle. Since power conversion causes loss, electric power energy stored in each of the vehicles may be consumed wastefully if power receiving and power supplying are excessively repeated between the vehicles.

The present disclosure has been made to solve the above-described problem and has an object to suppress power loss caused by repeated power receiving and power supplying between vehicles.

(1) A server according to the present disclosure includes: a communication device configured to communicate with a plurality of vehicles, each of the plurality of vehicles being configured to supply power to and receive power from another vehicle; and a controller configured to perform a matching process for setting a power-supplying vehicle and a power-receiving vehicle from the plurality of vehicles and for matching the power-supplying vehicle and the power-receiving vehicle. In the matching process, the controller is configured to prohibit setting, as the power-supplying vehicle, a vehicle included in the plurality of vehicles and having a power-receiving history that the power has been received from the another vehicle.

According to the above-described configuration, the vehicle included in the plurality of vehicles and having the history that power has been received from another vehicle is prohibited from being set as the power-supplying vehicle in the matching process. Accordingly, power receiving and power supplying is suppressed from being excessively repeated between the vehicles. Hence, electric power energy stored in each vehicle can be suppressed from being consumed wastefully as a whole.

(2) In a certain embodiment, the server further includes a storage configured to store information regarding the power-receiving history for each of the plurality of vehicles. The controller is configured to use the information regarding the power-receiving history, so as to determine whether or not each vehicle is the vehicle having the power-receiving history.

(3) In a certain embodiment, the controller is configured to provide, to each of the plurality of vehicles, a corresponding matching history flag indicating presence or absence of a history that the vehicle has been set as the power-receiving vehicle through the matching process. The information regarding the power-receiving history includes information of the matching history flag.

According to the above-described configuration, the matching history flag managed by the server is used to determine whether or not each vehicle has a history that power has been received from another vehicle.

(4) In a certain embodiment, each vehicle is configured to transmit, to the server, a power-receiving history flag indicating presence or absence of the power-receiving history. The information regarding the power-receiving history includes the power-receiving history flag.

According to the above-described configuration, the power-receiving history flag received by the server from each vehicle is used to determine whether or not each vehicle has a history that power has been received from another vehicle.

(5) An information providing system according to the present disclosure includes: a plurality of vehicles each configured to supply power to and receive power from another vehicle; and a server configured to communicate with the plurality of vehicles and configured to perform a matching process for setting a power-supplying vehicle and a power-receiving vehicle from the plurality of vehicles and for matching the power-supplying vehicle and the power-receiving vehicle. In the matching process, the information providing system is configured to prohibit setting, as the power-supplying vehicle, a vehicle included in the plurality of vehicles and having a power-receiving history that the power has been received from the another vehicle.

According to the above-described configuration, the vehicle included in the plurality of vehicles and having the history that power has been received from another vehicle is prohibited from being set as the power-supplying vehicle in the matching process. Accordingly, power receiving and power supplying is suppressed from being excessively repeated between the vehicles. Hence, electric power energy stored in each vehicle can be suppressed from being consumed wastefully as a whole.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

The following describes embodiments of the present disclosure with reference to figures in detail. It should be noted that the same or corresponding portions are given the same reference characters and are not described repeatedly.

<System Configuration>

Figure 1:
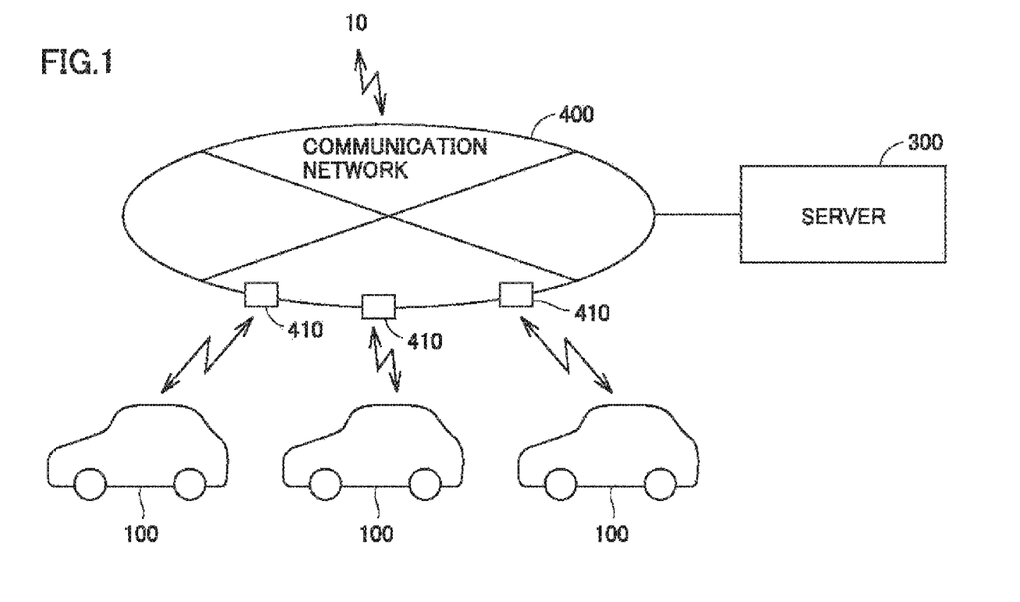
FIG. 1 schematically shows an entire configuration of an information providing system.

FIG. 1 schematically shows an entire configuration of an information providing system 10 according to the present embodiment. Information providing system 10 includes a plurality of electrically powered vehicles (hereinafter, also simply referred to as "vehicles") 100, and a server 300. Each vehicle 100 and server 300 are configured to communicate with each other via a communication network 400 such as the Internet or a telephone network. It should be noted that each vehicle 100 is configured to send and receive information to and from a base station 410 of communication network 400 through wireless communication.

As described below with reference to FIG. 2, vehicle 100 is an electric vehicle (EV) configured to generate driving power for traveling using electric power from a power storage device mounted thereon and to permit charging of the power storage device using electric power supplied from a power supply external to the vehicle.

Server 300 communicates with vehicle 100 and provides vehicle 100 with information about other vehicles.

Figure 2:
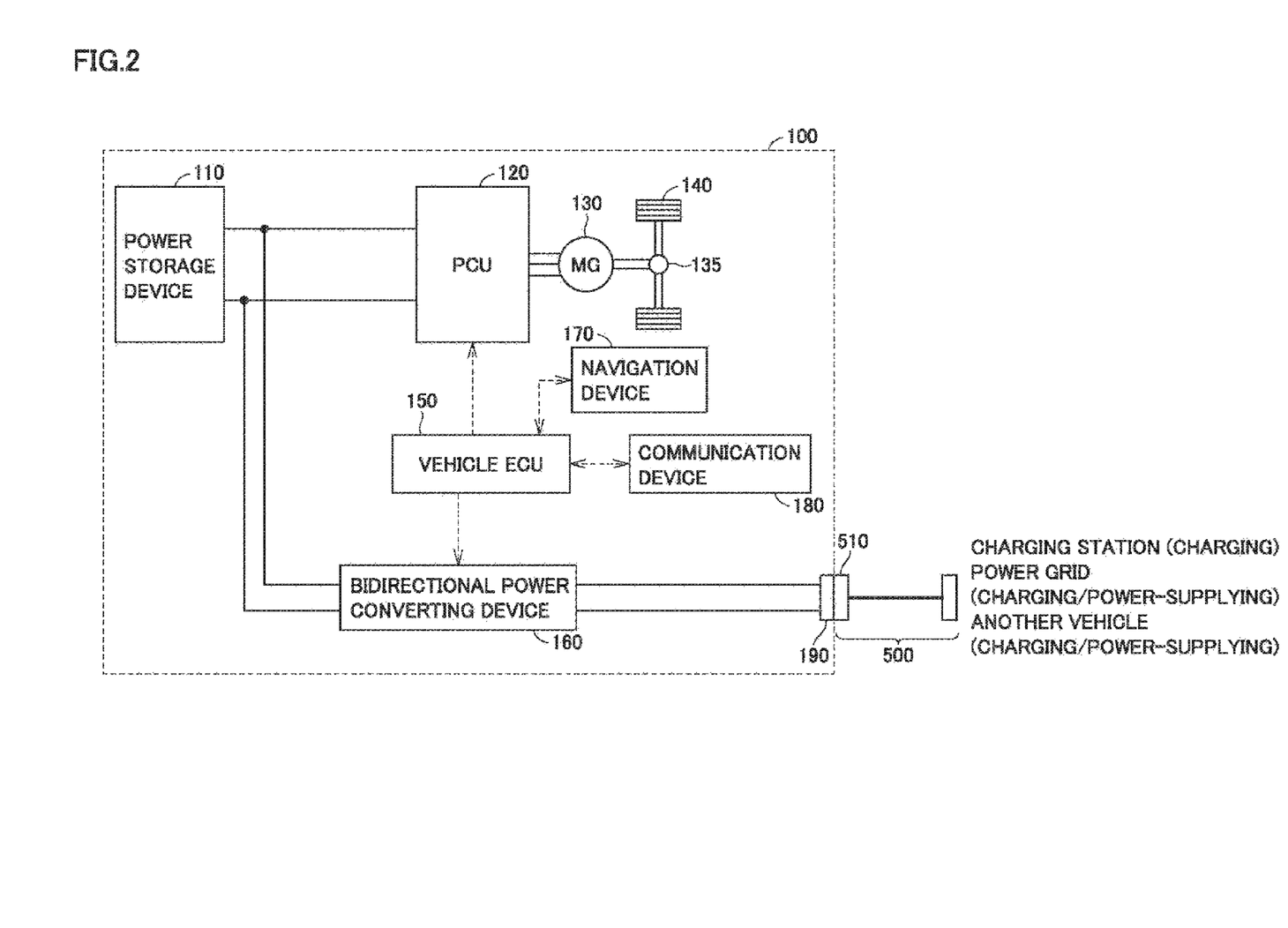
FIG. 2 shows an exemplary configuration of a vehicle.

FIG. 2 shows an exemplary configuration of vehicle 100. Vehicle 100 includes a power storage device 110, a PCU 120 serving as a driving device, a motor generator 130, a power transmitting gear 135, driving wheels 140, a vehicle ECU (Electronic Control Unit) 150, and a navigation device 170.

In vehicle 100, power storage device 110 can be charged using power supplied from a charging station or commercial power grid external to the vehicle. Moreover, vehicle 100 can output power of power storage device 110 to outside the vehicle, and can perform "inter-vehicle charging", which is charging and discharging between vehicle 100 and another vehicle.

Figure 3:
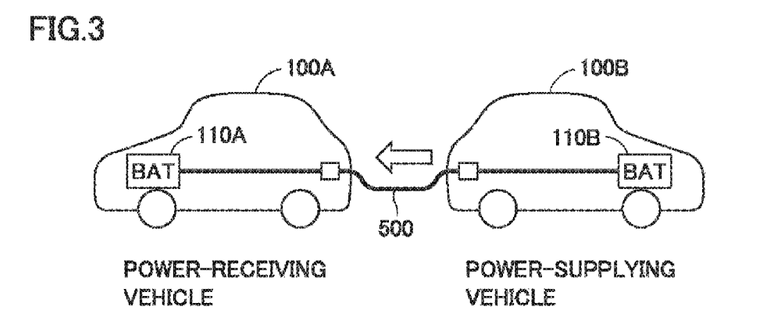
FIG. 3 illustrates inter-vehicle charging.

FIG. 3 illustrates the inter-vehicle charging. For the inter-vehicle charging, as shown in FIG. 3, a vehicle 100 (hereinafter, also referred to as "power-receiving vehicle 100A") to receive power and a vehicle 100 (hereinafter, also referred to as "power-supplying vehicle 100B") to supply power are connected to each other via a charging cable 500. Then, power is discharged from a power storage device 110B of power-supplying vehicle 100B to charge a power storage device 110A of power-receiving vehicle 100A.

Turning back to FIG. 2, power storage device 110 is configured to be charged and discharged. Power storage device 110 is configured to include a secondary battery such as a lithium ion battery or a nickel-hydrogen battery, or include a power storage element such as an electric double layer capacitor, for example.

Power storage device 110 supplies electric power to PCU 120 so as to generate driving power of vehicle 100. Further, power storage device 110 stores electric power generated by motor generator 130.

PCU 120 is configured to include power converting devices such as a converter and an inverter, which are not shown in the figure. Each of the converter and the inverter is controlled by a control signal from vehicle ECU 150 to convert DC power from power storage device 110 into AC power for driving motor generator 130.

Motor generator 130 is an alternating-current rotating electrical machine, such as a permanent-magnet type synchronous motor including a rotor having a permanent magnet embedded therein. Output torque of motor generator 130 is transmitted to driving wheels 140 via power transmitting gear 135 to travel vehicle 100. Motor generator 130 is capable of generating electric power using rotation power of driving wheels 140 when vehicle 100 operates for regenerative braking. The electric power thus generated is converted by PCU 120 into charging power for power storage device 110.

Although not shown in FIG. 2, vehicle ECU 150 includes a CPU (Central Processing Unit), a storage device, and an input/output buffer, so as to receive signals from sensors, send control signals to devices, and control vehicle 100 and the devices. It should be noted that they can be controlled by not only a process performed by software but also a process performed by dedicated hardware (electronic circuit) constructed therefor.

As a configuration for charging and discharging power storage device 110, vehicle 100 further includes a bidirectional power converting device 160, a communication device 180, and an inlet 190. A charging connector 510 of charging cable 500 is connected to inlet 190. Via charging cable 500, power supplied from another vehicle is transferred to vehicle 100.

Bidirectional power converting device 160 is connected between power storage device 110 and inlet 190. Bidirectional power converting device 160 is controlled by a control signal from vehicle ECU 150. When charging power storage device 110 using power supplied from another vehicle or the like, bidirectional power converting device 160 converts the power supplied from the other vehicle into power with which power storage device 110 can be charged. On the other hand, when supplying power of power storage device 110 to another vehicle or the like, bidirectional power converting device 160 converts the power of power storage device 110 into power that can be output to the other vehicle or the like.

Communication device 180 is an interface for communication between vehicle ECU 150 and server 300 external to the vehicle or another vehicle. As described above, communication device 180 is configured to communicate with server 300 via communication network 400.

Figure 4:
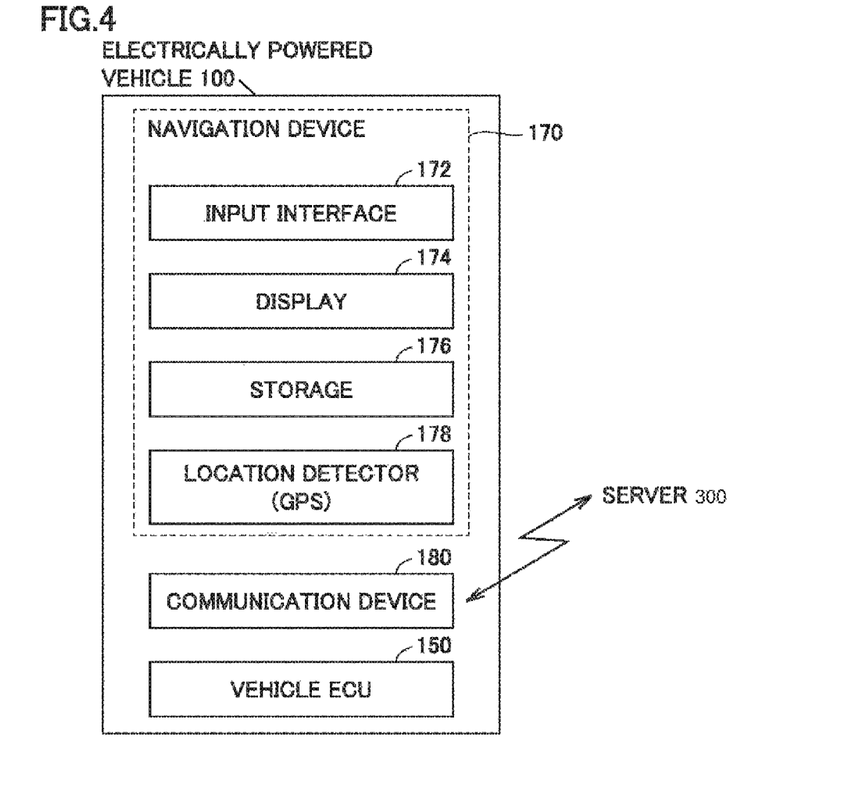
FIG. 4 is a block diagram showing a configuration in relation with a navigation device in the vehicle.

FIG. 4 is a block diagram showing a configuration in relation with navigation device 170 in vehicle 100. Navigation device 170 includes an input interface 172, a display 174, a storage 176, and a location detector 178 as shown in FIG. 4. Navigation device 170 uses map information stored in storage 176 and location information of vehicle 100 detected by GPS (Global Positioning System) of location detector 178, so as to present the current location of vehicle 100 on a map for the user and provide a navigation to a destination.

Display 174 is constructed of, for example, a liquid crystal panel and presents the current location of vehicle 100 or various information from vehicle ECU 150. Input interface 172 is constructed of a touch panel, a switch, or the like, and receives an operation by the user.

Figure 5:
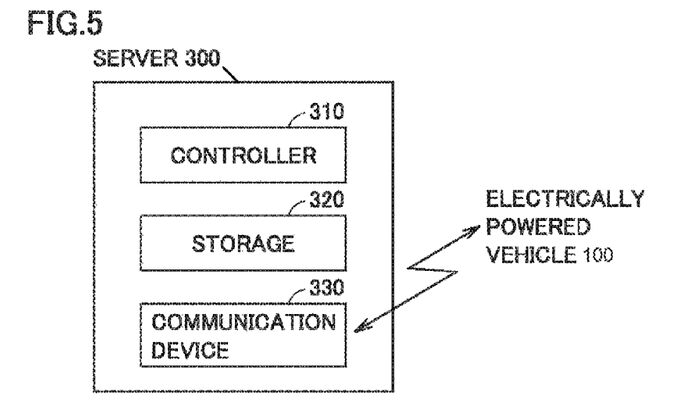
FIG. 5 is a block diagram showing a configuration of a server.

FIG. 5 is a block diagram showing a configuration of server 300. Server 300 includes a controller 310, a storage 320, and a communication device 330.

Communication device 330 is an interface for communication with vehicle 100 via communication network 400. In storage 320, the map information and the information received from vehicle 100 are stored. It should be noted that the "power-receiving history information" described below is also stored in storage 320.

Based on the information received from vehicle 100 by communication device 330 and the information stored in storage 320, controller 310 performs a process for matching vehicles that are to perform inter-vehicle charging.

<Matching of Vehicles that are to Perform Inter-Vehicle Charging>

As described above, vehicle 100 can perform inter-vehicle charging between vehicle 100 and another vehicle. Therefore, when a vehicle 100 (hereinafter, also referred to as "power-receiving requesting vehicle") having a power storage device 110 with a small remaining power amount and requesting reception of power from another vehicle can be matched to a vehicle 100 (hereinafter, also referred to as "power-supplying permitted vehicle") having a power storage device 110 with a large remaining power amount and permitted to supply power to another vehicle, electric energy stored in each vehicle 100 can be utilized effectively.

In view of this, information providing system 10 according to the present embodiment provides a service for: setting a candidate power-receiving vehicle and a candidate power-supplying vehicle from a plurality of vehicles 100; performing a "matching process" for matching the vehicles; and notifying a content of the matching to each of the matched vehicles.

However, when actually exchanging power between the matched vehicles, power conversion is performed in bidirectional power converting devices 160 of both the vehicles. The power conversion causes loss. Hence, if power receiving and power supplying are excessively repeated between the vehicles, electric power energy stored in each of the vehicles may be consumed wastefully as a whole.

In view of this, in information providing system 10 according to the first embodiment, a vehicle included in the plurality of vehicles 100 and having a history that power has been received from another vehicle is prohibited from being set as a power-supplying vehicle in the matching process. Hereinafter, details of this service will be described.

Figure 6:
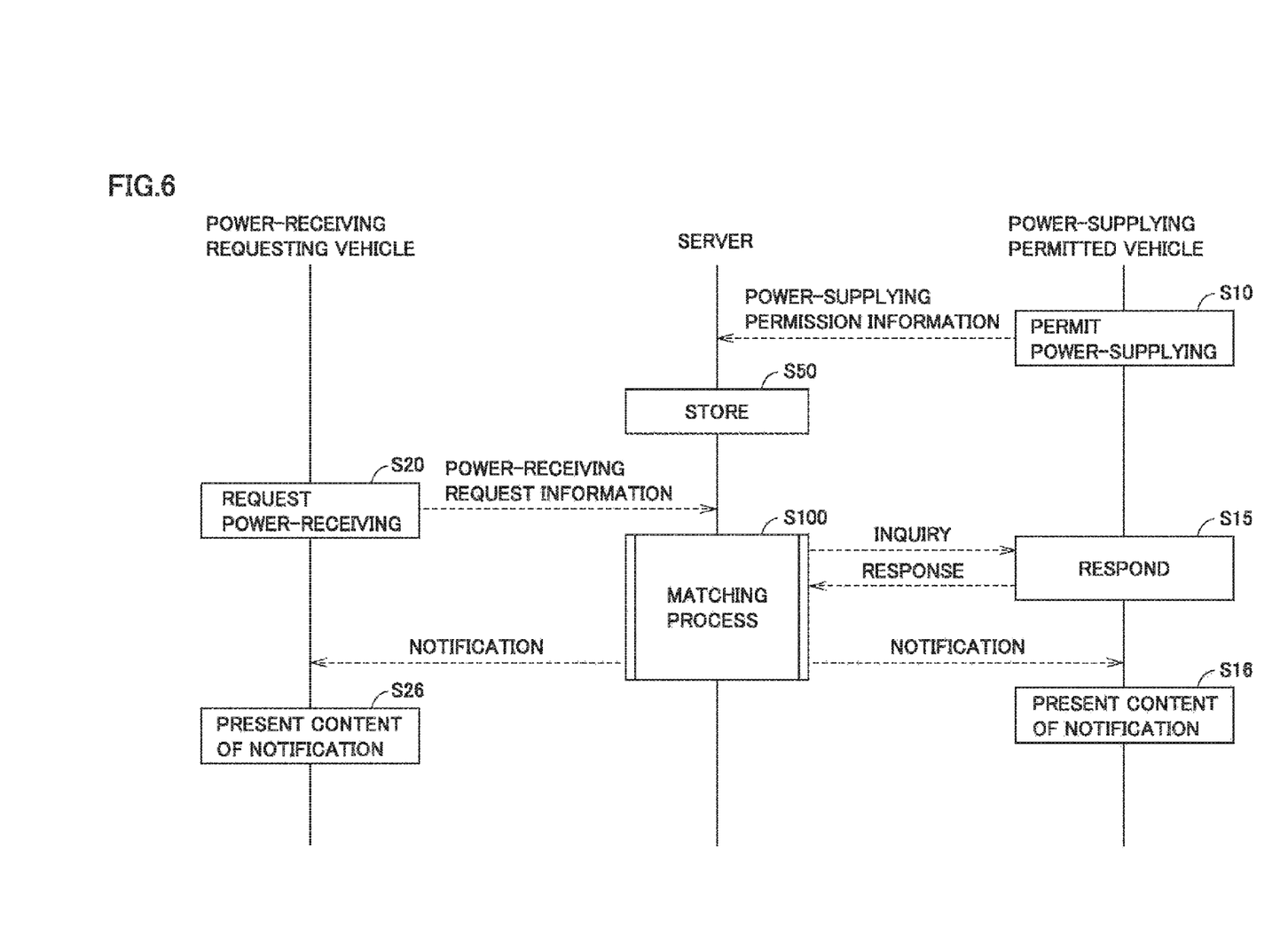
FIG. 6 is a sequence diagram showing an exemplary process performed among a power-receiving requesting vehicle, the server, and a power-supplying permitted vehicle included in the information providing system.

FIG. 6 is a sequence diagram showing an exemplary process among a power-receiving requesting vehicle (more specifically, vehicle ECU 150 of the power-receiving requesting vehicle), server 300 (more specifically, controller 310 of server 300), and a power-supplying permitted vehicle (more specifically, vehicle ECU 150 of the power-supplying permitted vehicle) included in information providing system 10. It should be noted that for simplicity of explanation, FIG. 6 illustrates one power-receiving requesting vehicle and one power-supplying permitted vehicle; however, there may be actually a plurality of power-receiving requesting vehicles and a plurality of power-supplying permitted vehicles.

When it is permitted in the power-supplying permitted vehicle to supply power to another vehicle in response to an operation of a user, the power-supplying permitted vehicle transmits power-supplying permission information to server 300 (step S10). The power-supplying permission information includes information such as a vehicle ID for specifying the power-supplying permitted vehicle, a current location of the power-supplying permitted vehicle, and a power amount (hereinafter, also referred to as "possible power-supplying amount") that can be supplied to another vehicle.

When the power-supplying permission information is received from the power-supplying permitted vehicle, server 300 stores, into storage 320, the power-supplying permission information received from the power-supplying permitted vehicle (step S50).

In order to request to receive power from another vehicle in response to an operation of the user or the like, the power-receiving requesting vehicle transmits power-receiving request information of the power-receiving requesting vehicle to server 300 (step S20). The power-receiving request information includes information such as a vehicle ID for specifying the power-receiving requesting vehicle, a current location of the power-receiving requesting vehicle, and a power amount (hereinafter, also referred to as "requested power-receiving amount") requested to be received from another vehicle.

When server 300 receives the power-receiving request information from the power-receiving requesting vehicle, server 300 sets the power-receiving requesting vehicle as a candidate power-receiving vehicle, and performs the above-described "matching process" (step S100).

In the matching process, based on the power-receiving request information received from the candidate power-receiving vehicle and the respective pieces of stored information of a plurality of power-supplying permitted vehicles in storage 320, server 300 sets a vehicle suitable to supply power to the candidate power-receiving vehicle, from the plurality of power-supplying permitted vehicles, and sets the vehicle as a candidate power-supplying vehicle.

Then, server 300 makes reference to the "power-receiving history information" stored in storage 320 so as to determine whether or not the set candidate power-supplying vehicle has a history that power has been received from another vehicle.

Figure 7:
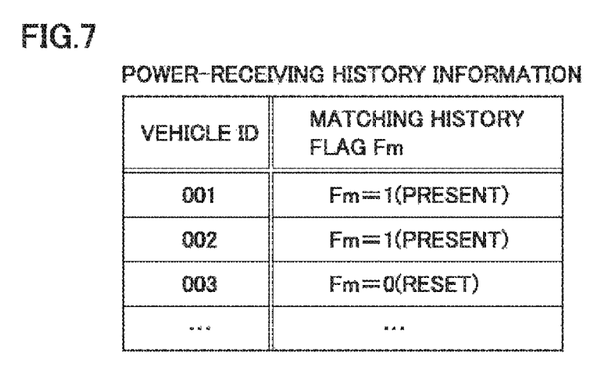
FIG. 7 shows exemplary power-receiving history information stored in a storage of the server.

FIG. 7 shows exemplary "power-receiving history information" stored in storage 320 of server 300. As shown in FIG. 7, the power-receiving history information includes: the vehicle ID; and a matching history flag Fm associated with the vehicle ID.

Matching history flag Fm is a flag indicating whether or not there is a history that the vehicle has been set as a power-receiving vehicle through the matching process. Matching history flag Fm of "1" indicates that there is a history that the vehicle has been set as a power-receiving vehicle. Matching history flag Fm of "0" indicates that the history that the vehicle has been set as a power-receiving vehicle is reset.

When the power-receiving vehicle is set through the matching process, server 300 sets matching history flag Fm of the vehicle to "1". When a predetermined time (for example, 24 hours) has passed since matching history flag Fm is set to "1", server 300 resets matching history flag Fm to "0" because it is considered that the amount of power received by the vehicle from the other vehicle has been already consumed.

Server 300 makes reference to the "power-receiving history information" shown in FIG. 7 so as to determine whether or not the set candidate power-supplying vehicle has a history that power has been received from another vehicle. When the vehicle ID of the set candidate power-supplying vehicle is included in the power-receiving history information and matching history flag Fm of the vehicle indicates "1", server 300 determines that the set candidate power-supplying vehicle has a history that power has been received from another vehicle. On the other hand, when the vehicle ID of the set candidate power-supplying vehicle is not included in the power-receiving history information or when the vehicle ID of the set candidate power-supplying vehicle is included in the power-receiving history information but matching history flag Fm of the vehicle is reset to "0", server 300 determines that the set candidate power-supplying vehicle does not have a history that power has been received from another vehicle.

When the set candidate power-supplying vehicle does not have a history that power has been received from another vehicle, server 300 proceeds with the matching process for the set candidate power-supplying vehicle and the candidate power-receiving vehicle.

Specifically, server 300 makes an inquiry to the set candidate power-supplying vehicle as to whether to approve the matching. The candidate power-supplying vehicle having received this inquiry makes a response to server 300 as to whether to approve the matching (step S15). When server 300 receives, from the candidate power-supplying vehicle, a response indicating that the matching is approved, the matching of the candidate power-supplying vehicle and the candidate power-receiving vehicle is confirmed. Then, server 300 notifies, to both the matched vehicles, the respective pieces of information of the matched vehicles and the like. The candidate power-receiving vehicle having received the notification from server 300 causes the content of the received notification to be presented on display 174 (step S26). Similarly, the candidate power-supplying vehicle having received the notification from server 300 causes the content of the received notification to be presented on display 174 (step S26). Accordingly, the user of each vehicle can check the matched counterpart vehicle.

On the other hand, when the set candidate power-supplying vehicle has a history that power has been received from another vehicle, server 300 prohibits setting the set candidate power-supplying vehicle as a power-supplying vehicle in the matching process. Specifically, server 300 excludes the candidate power-supplying vehicle determined as having a history that power has been received from another vehicle, and selects a new candidate power-supplying vehicle again from the remaining power-supplying permitted vehicles. Accordingly, the vehicle having a history that power has been received from another vehicle is suppressed from being set as a power-supplying vehicle for supplying power to another vehicle through the matching process. Hence, power receiving and power supplying is suppressed from being excessively repeated between the vehicles.

Figure 8:
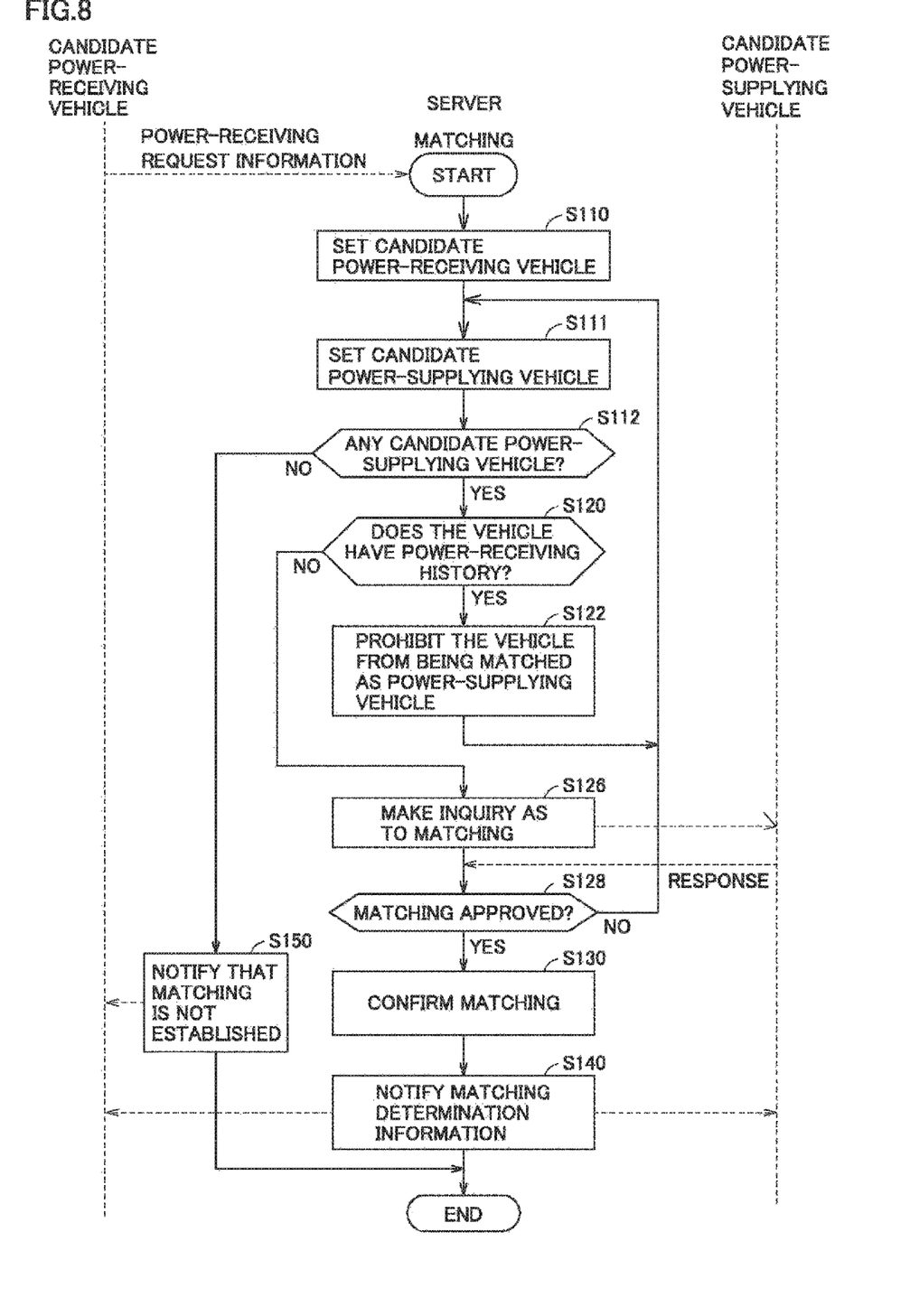
FIG. 8 is a flowchart showing an exemplary detailed procedure of a matching process performed by the server.

FIG. 8 is a flowchart showing an exemplary detailed procedure of the matching process (step S100 of FIG. 6) performed by server 300. Server 300 is triggered to start the process of this flowchart by receiving the power-receiving request information from the power-receiving requesting vehicle.

First, server 300 sets, as a candidate power-receiving vehicle, the power-receiving requesting vehicle specified by the power-receiving request information (S110).

Next, server 300 performs a process for setting a candidate power-supplying vehicle suitable for the candidate power-receiving vehicle, based on the power-receiving request information received from the candidate power-receiving vehicle and respective pieces of stored power-supplying permission information of a plurality of power-supplying permitted vehicles in storage 320 (step S111). For example, server 300 sets, as the candidate power-supplying vehicle, a power-supplying permitted vehicle whose distance from the candidate power-receiving vehicle is less than a threshold value and whose possible power-supplying amount is the closest to the requested power-receiving amount of the candidate power-receiving vehicle.

Server 300 determines whether or not a candidate power-supplying vehicle has been set by the process of step S111 (step S112). When no candidate power-supplying vehicle has been set (NO in step S112), server 300 notifies the candidate power-receiving vehicle that the matching is not established (step S150).

When the candidate power-supplying vehicle is set (YES in step S112), server 300 makes reference to the power-receiving history information (FIG. 7 above) stored in storage 320 so as to determine whether or not the set candidate power-supplying vehicle has a history that power has been received from another vehicle (step S120). The specific method of determination has been already described with reference to FIG. 7 and therefore will not be described in detail here.

When the set candidate power-supplying vehicle has a history that power has been received from another vehicle (YES in step S120), server 300 prohibits setting the set candidate power-supplying vehicle as a power-supplying vehicle in the matching process (step S122). Then, server 300 returns the process to step S111 and performs the process of setting a candidate power-supplying vehicle again. On this occasion, server 300 excludes the candidate power-supplying vehicle prohibited from being set as a power-supplying vehicle and selects a new candidate power-supplying vehicle again from the remaining power-supplying permitted vehicles.

On the other hand, when the set candidate power-supplying vehicle does not have a history that power has been received from another vehicle (NO in step S120), server 300 transmits the information of the candidate power-receiving vehicle and the like to the candidate power-supplying vehicle so as to make an inquiry as to whether to match to the candidate power-receiving vehicle (step S126).

Next, server 300 determines whether or not a response indicating that the matching is approved is received from the candidate power-supplying vehicle (step S128).

When a response from the candidate power-supplying vehicle is received to indicate that the matching is rejected (NO in step S128), server 300 returns the process to step S111 and performs the process for setting a candidate power-supplying vehicle again. On this occasion, server 300 excludes the candidate power-supplying vehicle having made a response indicating that the matching is rejected, and selects a new candidate power-supplying vehicle from the remaining power-supplying permitted vehicles again.

When there is a response from the candidate power-supplying vehicle to indicate that the matching is approved (YES in step S128), server 300 confirms the matching of the candidate power-receiving vehicle and the candidate power-supplying vehicle (step S130).

Then, server 300 notifies, to both the matched vehicles, matching determination information including the information of each matched vehicle and the like (step S140).

As described above, server 300 according to the present embodiment performs the "matching process" for setting a candidate power-receiving vehicle and a candidate power-supplying vehicle from the plurality of vehicles 100 and for matching both the vehicles.

On this occasion, in the matching process, server 300 prohibits setting, as a power-supplying vehicle, a vehicle included in the plurality of vehicles 100 and having a history that power has been received from another vehicle. Accordingly, power receiving and power supplying are suppressed from being expressively repeated between the vehicles, whereby electric power energy stored in each vehicle 100 is suppressed from being consumed wastefully as a whole.

In particular, server 300 according to the present embodiment uses "matching history flag Fm" included in the power-receiving history information stored in storage 320 so as to determine whether or not the candidate power-supplying vehicle has a history that power has been received from another vehicle. This "matching history flag Fm" is a flag that is provided by server 300 to the vehicle set as a power-receiving vehicle through the matching process and that is managed by server 300. Accordingly, server 300 can use "matching history flag Fm", which server 300 itself provides and manages, to determine whether or not the candidate power-supplying vehicle has a history that power has been received from another vehicle.

<Modification 1>

In the above-described embodiment, it has been illustratively described that "matching history flag Fm" provided and managed by server 300 is included in "the power-receiving history information" stored in storage 320 of server 300.

However, the flag included in the "power-receiving history information" is not limited to "matching history flag Fm". For example, instead of or in addition to matching history flag Fm, the "power-receiving history information" may include a "power-receiving history flag Fc" indicating whether or not each vehicle has a history that power has been actually received power from another vehicle. In this way, by making reference to "power-receiving history flag Fc" included in the power-receiving history information, server 300 can precisely determine whether or not the candidate power-supplying vehicle has a history that power has been actually received from another vehicle.

It should be noted that "power-receiving history flag Fc" is a flag provided and managed by each vehicle. For example, when each vehicle receives power from another vehicle, the vehicle sets power-receiving history flag Fc to "1" (presence of power-receiving history), and when a predetermined reset condition is satisfied, the vehicle sets power-receiving history flag Fc to "0" (absence of power-receiving history). For example, whenever power-receiving history flag Fc is updated, each vehicle transmits the newest power-receiving history flag Fc as well as the vehicle ID of the vehicle to server 300. Accordingly, server 300 can store, in storage 320 as the power-receiving history information, the vehicle ID and newest power-receiving history flag Fc received from each vehicle.

<Modification 2>

In the above-described embodiment, it has been illustratively described that server 300 resets matching history flag Fm to "0" when a predetermined time has passed since matching history flag Fm is set to "1".

However, the reset condition for matching history flag Fm is not limited to this. For example, when information indicating that an amount of power received from another vehicle has been consumed by subsequent traveling is received from a vehicle having a matching history flag Fm of "1", matching history flag Fm of the vehicle may be reset to "0". Also, when information indicating that power has been further received from a charging station or commercial power grid after receiving power from another vehicle is received from a vehicle having a matching history flag Fm of "1", matching history flag Fm of the vehicle may be reset to "0", because it is considered that the amount of power received from the other vehicle has been already consumed. It should be noted that the same applies to the reset condition for "power-receiving history flag Fc" described in modification 1 above.

<Modification 3>

In information providing system 10 according to the above-described embodiment, server 300 sets a candidate power-supplying vehicle while excluding a vehicle having a history that power has been received from another vehicle, whereby the vehicle having a history that power has been received from another vehicle is prohibited from being set as a power-supplying vehicle.

However, the method of prohibiting setting, as a power-supplying vehicle, the vehicle having a history that power has been received from another vehicle is not limited to this. For example, the vehicle having a history that power has been received from another vehicle may be prohibited from being set as a power-supplying vehicle in the following manner: each vehicle 100 is configured to manage its history that power has been received from another vehicle, and when vehicle 100 has a history that power has been received from another vehicle, vehicle 100 is configured not to transmit the power-supplying permission information to server 300 (for example, vehicle 100 is configured to avoid the user from performing an operation for transmitting the power-supplying permission information).

<Modification 4>

In the above-described embodiment, it has been described that one power-supplying vehicle and one power-receiving vehicle are matched through the matching process. However, a combination of the matched vehicles is not limited to this. For example, two or more power-receiving vehicles can be matched to one power-supplying vehicle.

<Modification 5>

In the above-described embodiment, it has been illustratively described that each vehicle 100 is provided with communication device 180 configured to be communicatively connected to communication network 400 directly (see FIG. 4).

However, the communicative connection between each vehicle 100 and communication network 400 may be made using a mobile terminal held by the user of each vehicle 100. Specifically, each vehicle 100 may be configured to perform short distance communication with a mobile terminal held by the user and configured to be communicatively connected to communication network 400 via the mobile terminal.

<Modification 6>

In the above-described embodiment, it has been illustratively described that server 300 notifies the information of the matched vehicles to the matched vehicles as the matching determination information.

However, the matching determination information notified by server 300 to the matched vehicles is not limited only to the information described above. For example, in addition to the above-described information, server 300 may transmit, to the matched vehicles, a gathering location at which the matched vehicles will gather to perform inter-vehicle charging, a distance from each vehicle to the gathering location, a time required by each vehicle to move to the gathering location, a gathering time, a power amount that can be supplied by the candidate power-supplying vehicle, a power-receiving amount requested by the candidate power-receiving vehicle, user information of the matched counterpart (such as contact information and the like).

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A server comprising:
 a communication device configured to communicate with a plurality of vehicles, each of the plurality of vehicles being able to supply power to and receive power from another vehicle; and
 a controller configured to perform a matching process for setting a power-supplying vehicle and a power-receiving vehicle from the plurality of vehicles and for matching the power-supplying vehicle and the power-receiving vehicle,
 wherein the controller matches the power-supplying vehicle and the power-receiving vehicle based on:
  a distance between the power-supplying vehicle and the power-receiving vehicle being less than a threshold value; and
  a charge supply for the power-supplying vehicle being higher than a requested amount of charge for the power-receiving vehicle; and
 in the matching process, the controller being configured to prohibit setting, as the power-supplying vehicle, a vehicle included in the plurality of vehicles and having a power-receiving history that power has been received from the another vehicle,
 the server further comprising a storage unit configured to store information regarding the power-receiving history that the power has been received from the another vehicle for each of the plurality of vehicles, and
 wherein the controller is configured to use the information regarding the power-receiving history that the power has been received from the another vehicle, so as to determine whether or not each vehicle is the vehicle having the power-receiving history that the power has been received from the another vehicle,
 wherein the controller is configured to provide, to each of the plurality of vehicles, a corresponding matching history flag indicating presence or absence of a history that a vehicle having a power-receiving history that the power has been received from the another vehicle through the matching process,
 wherein the information regarding the power-receiving history includes information of the matching history flag,
 wherein each of the plurality of vehicles is configured to transmit, to the server, a power-receiving history flag indicating presence or absence of a history that a vehicle having the power-receiving history that the power has been received from the another vehicle, and
 wherein the information regarding the power-receiving history includes the power-receiving history flag.

2. An information providing system comprising:
 a plurality of vehicles each configured to supply power to and receive power from another vehicle; and
 a server configured to communicate with the plurality of vehicles and configured to perform a matching process for setting a power-supplying vehicle and a power-receiving vehicle from the plurality of vehicles and for matching the power-supplying vehicle and the power-receiving vehicle,
 wherein the server matches the power-supplying vehicle and the power-receiving vehicle based on:
  a distance between the power-supplying vehicle and the power-receiving vehicle being less than a threshold value; and
  a charge supply for the power-supplying vehicle being higher than a requested amount of charge for the power-receiving vehicle; and
 in the matching process, the information providing system being configured to prohibit setting, as the power-supplying vehicle, a vehicle included in the plurality of vehicles and having a power-receiving history that power has been received from the another vehicle,
 the server further comprising a storage unit configured to store information regarding the power-receiving history that the power has been received from the another vehicle for each of the plurality of vehicles, and
 wherein the server is configured to use the information regarding the power-receiving history that the power has been received from the another vehicle, so as to determine whether or not each vehicle is the vehicle having the power-receiving history that the power has been received from the another vehicle,
 wherein the server is configured to provide, to each of the plurality of vehicles, a corresponding matching history flag indicating presence or absence of a history that a vehicle having a power-receiving history that the power has been received from the another vehicle through the matching process,
 wherein the information regarding the power-receiving history includes information of the matching history flag,
 wherein each of the plurality of vehicles is configured to transmit, to the server, a power-receiving history flag indicating presence or absence of a history that a vehicle having the power-receiving history that the power has been received from the another vehicle, and
 wherein the information regarding the power-receiving history includes the power-receiving history flag.

* * * * *